United States Patent
Siegel et al.

(10) Patent No.: US 7,278,582 B1
(45) Date of Patent: Oct. 9, 2007

(54) HARDWARE SECURITY MODULE (HSM) CHIP CARD

(75) Inventors: Ellen H. Siegel, San Carlos, CA (US); Dwight F. Hare, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 336 days.

(21) Appl. No.: 11/004,316

(22) Filed: Dec. 3, 2004

(51) Int. Cl.
*G06K 19/06* (2006.01)

(52) U.S. Cl. .................. 235/492; 235/487; 235/451

(58) Field of Classification Search ............... 235/451, 235/492, 487, 382, 382.5, 380
See application file for complete search history.

(56) References Cited

U.S. PATENT DOCUMENTS

2003/0177392 A1* 9/2003 Hiltgen .................. 713/201
2004/0025028 A1* 2/2004 Takeuchi ................ 713/184
2005/0050324 A1* 3/2005 Corbett et al. ......... 713/168

* cited by examiner

*Primary Examiner*—Steven S. Paik
(74) *Attorney, Agent, or Firm*—Martine Penilla & Gencarella, LLP

(57) ABSTRACT

Processing circuitry is integrated within a hardware security module (HSM) chip card. The processing circuitry is configured to operate in accordance with a set of program instructions stored in a memory integrated within the HSM chip card. The set of program instructions includes program instructions for implementing a public-key cryptography standard (PKCS). The PKCS includes processes for generating and storing a master key. The master key is to be stored in the memory integrated within the HSM chip card. Also, using the master key stored in the memory of the HSM chip card, the HSM chip card enables direct management control of standard chip cards.

18 Claims, 4 Drawing Sheets

HARDWARE SECURITY MODULE (HSM) CHIP CARD

BACKGROUND

Hardware security modules (HSMs) are used to protect highly sensitive data. For example, HSMs are generally defined to handle cryptographic responsibilities, such as key generation, public/private key cryptography, data encryption, and secure storage of cryptographic data. As implied by the name, conventional HSMs provide their functionality by way of hardware, i.e., circuitry. The conventional HSM hardware is defined to provide a specific and restrictive external interface that allows only authorized entities to access the data stored with the HSM and control the HSM for the purpose of generating data. Extensive complex circuitry is required to implement the functional and storage requirements of the HSM. Thus, the conventional HSM, as implemented in hardware, can be prohibitively expensive for use in deployments that only require a limited subset of the security features offered by the conventional HSM.

SUMMARY

It should be appreciated that the present invention can be implemented in numerous ways, such as a process, an apparatus, a system, a device or a method on a computer readable medium. Several inventive embodiments of the present invention are described below.

In one embodiment, a hardware security module (HSM) chip card is disclosed. The HSM chip card includes processing circuitry integrated thereon. The processing circuitry is configured to operate in accordance with a set of program instructions. The HSM chip card also includes a memory integrated thereon. The memory is configured to store the set of program instructions. The set of program instructions includes program instructions for implementing a public-key cryptography standard (PKCS). The PKCS includes processes for generating and storing a master key, wherein the master key is to be stored in the memory on the HSM chip card. Also, using the master key stored in the memory, the HSM chip card enables direct management control of standard chip cards.

In another embodiment, a HSM system is disclosed. The HSM system includes a chip card, a chip card reader, and a server. The chip card is defined to include processing circuitry and a memory. The processing circuitry is configured to operate in accordance with a set of program instructions for implementing a PKCS. The memory is configured to store the set of program instructions for implementing the PKCS. The chip card reader is configured to interface with the chip card and enable access to data and functionality within the chip card. The server is defined to communicate with the chip card, via the chip card reader.

In another embodiment, a method for providing a HSM is disclosed. The method includes an operation for providing a chip card having processing circuitry capable of operating in accordance with a set of instructions stored in a memory of the chip card. The method also includes an operation for loading a set of instructions for implementing a PKCS into the memory of the chip card. In another operation, the chip card is interfaced with a server configured to operate in accordance with the PKCS. An operation is further provided for networking the server to enable network entities external to the server and the chip card to interact with the chip card when properly authorized.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
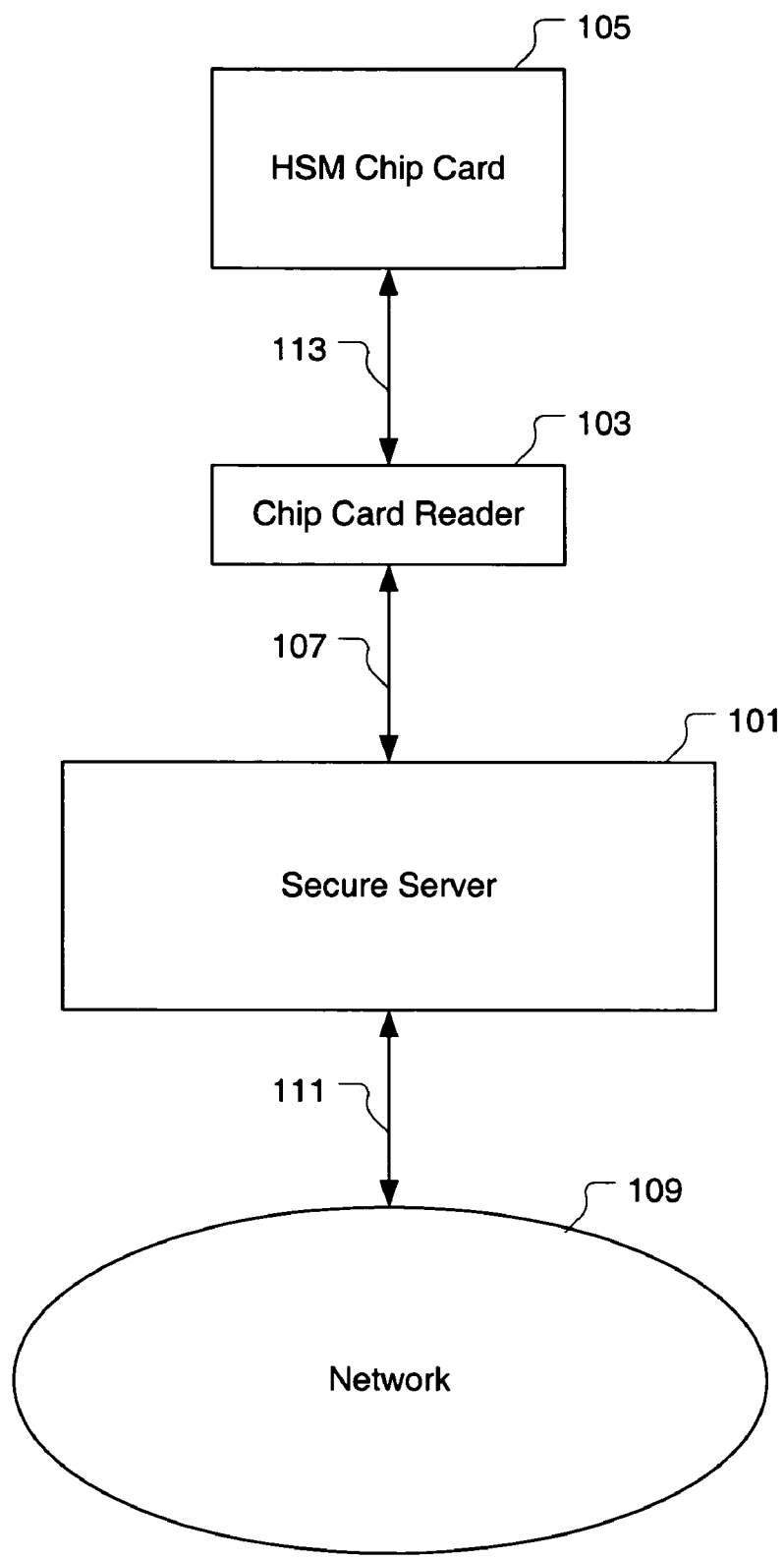
FIG. 1 is an illustration showing a hardware security module (HSM) system, in accordance with one embodiment of the present invention.

FIG. 1 is an illustration showing a hardware security module (HSM) system, in accordance with one embodiment of the present invention. The HSM system includes a secure server ("server") 101, a card reader 103, and an HSM chip card 105. The server 101 is configured to communicate with the HSM chip card 105 via the card reader 103 and connections 107 and 113. The server 101 is further configured to communicate with a network 109 through a connection 111. It should be appreciated that the network 109 can include a number of interconnected computing entities having an interest in accessing the HSM chip card 105 via the server 101. In one embodiment, communication through the network 109 is performed using a secure protocol, e.g., Secure Sockets Layer (SSL). Also, in one embodiment, the server's 101 connection to the network 109 can be secured by a firewall which would restrict unauthorized access to the server 101 from the network 109. It should be appreciated that the server 101 can include a number of components not explicitly shown in the exemplary HSM system of FIG. 1. For example, the server 101 includes a processor and other common computer components and peripheral devices, such as storage components, display components, user interface components, etc. It should also be appreciated that, in various embodiments, the network 109 can be defined in accordance with a wireless network, a physical network, or a combination thereof, as known to those skilled in the art.

Both the card reader 103 and the HSM chip card 105 are configured to communicate with each other through the connection 113. In one embodiment, the connection 113 is defined as a physical interface to enable the HSM chip card 105 to be physically connected to the card reader 103. In this embodiment, communication occurs through physical connections between the HSM chip card 105 and the card reader 103. In another embodiment, the connection 113 is defined as a wireless interface to enable the HSM chip card 105 to communicate with the card reader 103 without direct physical contact. It should be appreciated that the HSM system of the present invention can be implemented using essentially any embodiment to define connections between the server 101, the card reader 103, and the HSM chip card 105.

Figure 2:
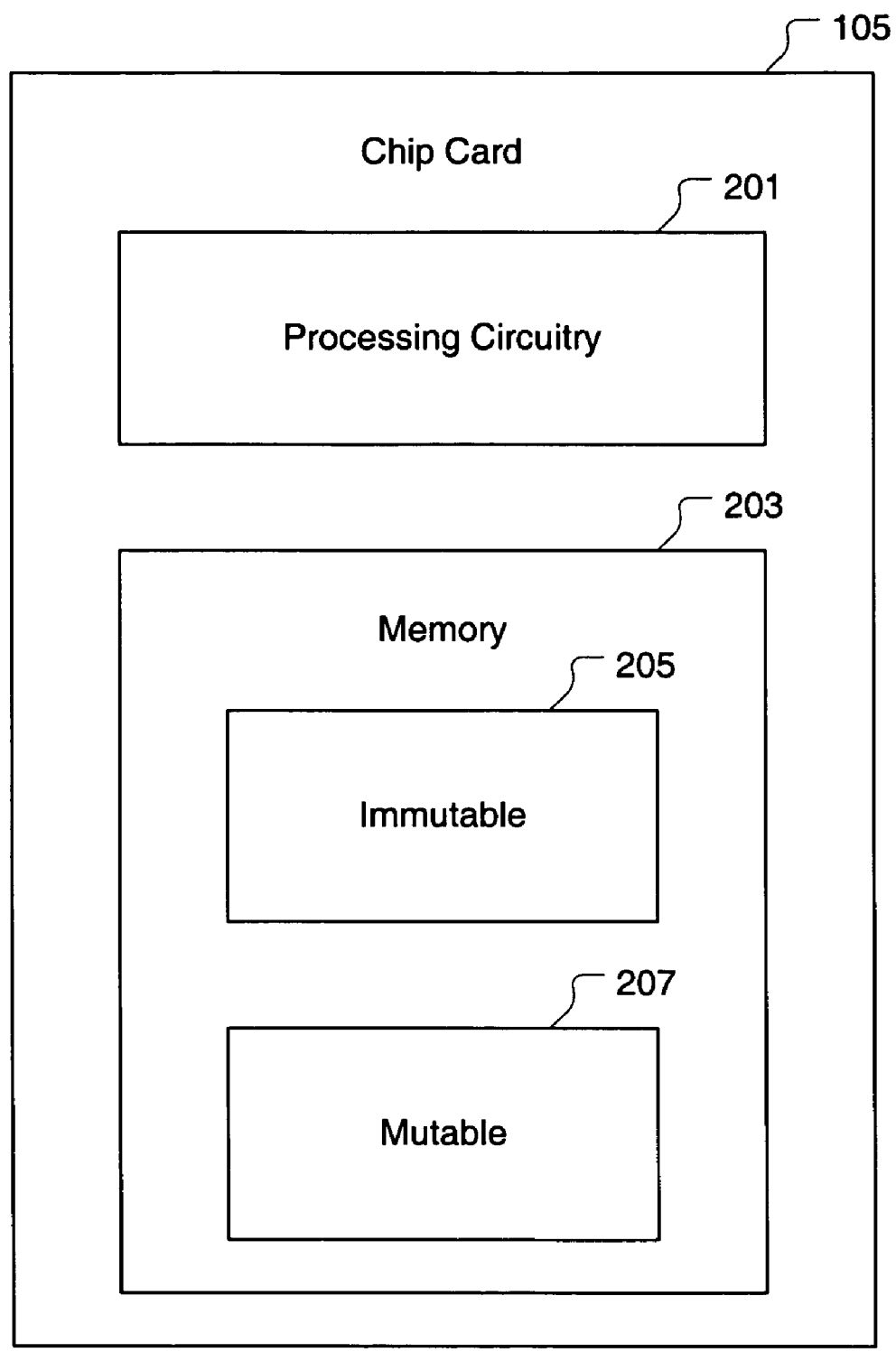
FIG. 2 is an illustration showing an exemplary HSM chip card hardware architecture, in accordance with one embodiment of the present invention.

FIG. 2 is an illustration showing an exemplary HSM chip card 105 hardware architecture, in accordance with one embodiment of the present invention. The exemplary HSM chip card 105 includes processing circuitry 201 and a memory 203. In one embodiment, the HSM chip card 105 is configured to enable compliance with a Global Platform Card Specification. The processing circuitry 201 is defined to operate in accordance with program instructions stored in the memory 203. The memory 203 is defined to include an immutable persistent memory portion 205 and a mutable persistent memory portion 207. Data is entered into the immutable persistent memory portion during manufacture of the HSM chip card 105 and cannot be removed, but can be disabled. In contrast, data can be entered and removed from the mutable persistent memory portion at any time during the HSM chip card 105 lifecycle following manufacture. In one embodiment, the HSM chip card 105 is a Java card defined to be compliant with a Java Card Specification and with Java Card Enterprise Software. In this embodiment, the HSM chip card 105 can be configured to include functionality beyond what is necessary to fulfill HSM system responsibilities.

Figure 3:
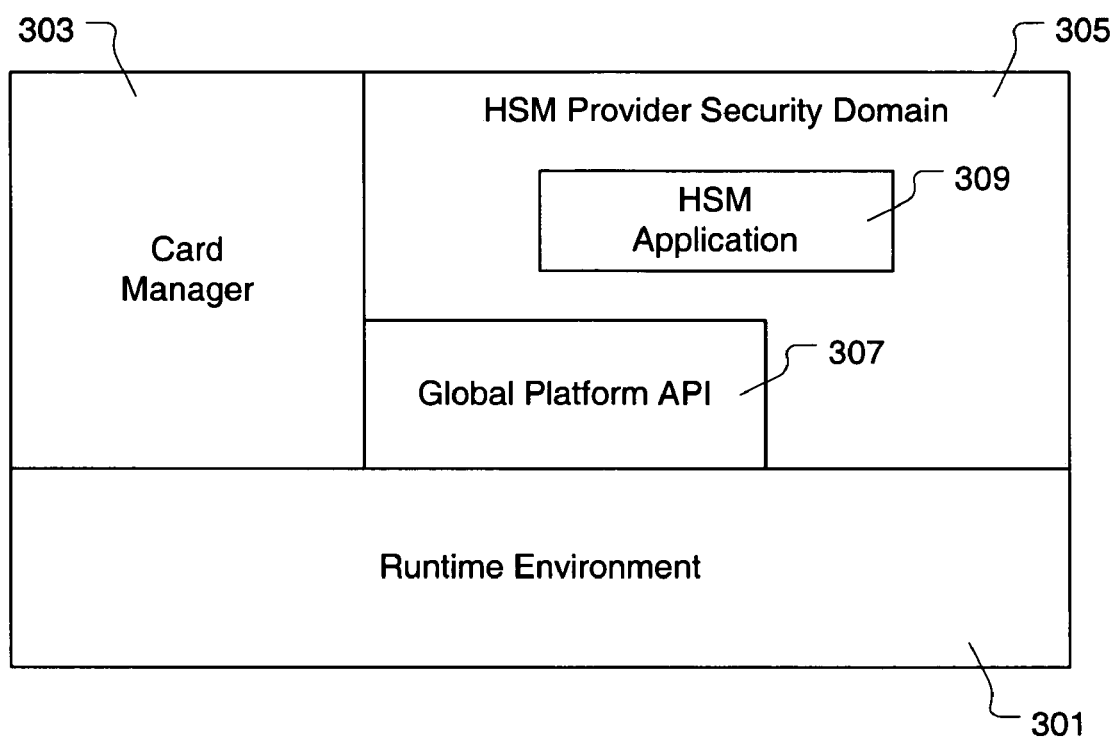
FIG. 3 is an illustration showing an HSM chip card software architecture, in accordance with one embodiment of the present invention.

FIG. 3 is an illustration showing an HSM chip card 105 software architecture, in accordance with one embodiment of the present invention. The HSM chip card 105 software architecture includes a runtime environment 301. The runtime environment 301 provides an application programming interface (API) to enable applications resident on the HSM chip card 105 to function with the HSM chip card 105 processing circuitry 201. The runtime environment 301 also directs memory 203 usage such that applications operating on the HSM chip card 105 are provided with secure storage and sufficient execution space.

The HSM chip card 105 software architecture also includes a card manager 303. The card manager 303 functions in a provisioning phase of the HSM chip card 105 to load, modify, or delete applications or security domains. A secure channel for communication can be established between the card manager 303 and an off-card entity, such as a server. The secure channel represents a logical link between the off-card entity and the card manager 303. The secure channel can also define a logical link between the off-card entity and an application executing on the HSM chip card 105. In the embodiment where the HSM chip card 105 is a Java card, the card manager 303 is involved in the provisioning phase when the secure channel to the card manager 303 is established and used to load, modify, or delete Java card applets or security domains. Once the Java card applets are loaded and initialized, the off-card entity, e.g., server, can communicate directly to the Java card applets by sending Application Data Protocol Units (APDUs) directly to the Java card applets. The HSM chip card 105 further includes a Global Platform API 307 defined to provide applications resident on the HSM chip card 105 with access to card management services provided by the card manager 303. Also, the Global Platform API 307 can be used by the card manager 303 to assist in management of card operations and content.

The HSM chip card 105 further includes an HSM provider security domain 305. The HSM provider security domain 305 functions as an on-card representative of the HSM provider. The HSM provider security domain 305 provides cryptographic services for the HSM provider's applications resident on the HSM chip card 105. The HSM chip card 105 also includes an HSM application 309. The HSM application 309 is defined to provide the HSM functionality of the HSM chip card 309. In the embodiment where the HSM chip card 105 is a Java card, the HSM provider security domain 305 is represented by a context in which the HSM application 309 executes and any associated cryptographic service not implemented in the Java card infrastructure executes. Therefore, in contrast to conventional hardware-based HSM technology, the HSM chip card 105 of the present invention provides the HSM functionality by way of software executing on the HSM chip card 105. Additionally, it should be appreciated that the HSM chip card 105 can include other provider security domains and other provider applications that function separately from the HSM application 309.

In accordance with the foregoing, the HSM chip card 105 includes processing circuitry 201 defined to operate in accordance with a set of program instructions, i.e., the HSM application 309, as stored in the memory 203 integrated within the HSM chip card 105. The HSM application 309 includes program instructions for implementing a public-key cryptography standard (PKCS). In one embodiment, the HSM application 309 includes program instructions for exporting a Cryptographic Token Interface Standard known as PKCS#11. In one embodiment, the HSM application 309 can be defined to implement PKCS#11 in its entirety. In another embodiment, the HSM application 309 can be defined to implement a subset of PKCS#11 that is suited for the particular processing and memory capabilities of the HSM chip card 105. It should be appreciated that the HSM chip card 105 and the server 101 communicate through a PKCS#11 interface. More specifically, the server 101 includes a PKCS#11 library to enable two-way communication of various PKCS#11 instructions with the HSM application 309 operating on the HSM chip card 105. It should be further appreciated that communication between the server 101 and the HSM chip card 105 over the secure channel is performed using APDUs. In the context of the present invention, PKCS#11 is an API. Thus, applications executing on the server 101 program to the PKCS#11 API. The server 101 also provides a PKCS#11 library for translating the PKCS#11 API calls into appropriate APDUs to send to the HSM application 309 executing on the HSM chip card 105. Additionally, in one embodiment of the present invention a PKCS#11 library can be provided on a computer responsible for brokering APDU communication with the HSM application 309.

PKCS#11 includes many processes, including a process for generating and storing a master key. The master key to be generated by the HSM application 309 can be securely stored in the memory 203 of the HSM chip card 105. By generating the master key and storing the master key in the memory 203, the HSM chip card 105 enables direct management control of other standard chip cards that are associated with the master key.

As previously mentioned, in one embodiment the HSM chip card 105 is a Java card compliant with Java Card Enterprise Software. In this embodiment, the HSM chip card 105 includes a Java virtual machine configured to execute applets. The HSM application 309 can be represented by one or more applets defined to implement PKCS#11. For example, in one embodiment, the HSM application 309 can include an applet for storing the master key for a batch of Java cards. A batch of Java cards can include thousands of Java cards tied to the single master key.

To establish a secure communication channel between the server 101 and a Java card from the batch of Java cards, the server 101 needs to have the master key associated with the batch of Java cards. Through the secure communication channel, the server 101 can establish communication with the HSM chip card 105 and determine the master key. Once the master key is determined, the server 101 can instruct the HSM chip card 105 to generate the diversified master key for the Java card. The server 101 can then use the diversified master key for the Java card to establish a secure session with the Java card. Hence, the diversified master key represents the shared secret between the server 101 and the Java card. Since the diversified master keys are stored on their respective Java card and can be derived using the master key, it is only necessary for the HSM to store the master key for the batch of Java cards. The HSM chip card 105 can store any number of master keys depending on the memory 203 capacity. Also, due to their relatively low cost, it is conceivable to have a number of HSM chip cards 105 assigned to handle master keys on a one master key-to-one HSM chip card 105 basis.

In addition to handling master keys, the HSM application 309 can also be defined to implement the following features of the PKCS#11:
- generate a master key, e.g., a 128-bit master key,
- use the master key to perform encryption,
- extracting Rivest, Shamir, and Adleman (RSA) public key data,
- generating a unique RSA key pair for key wrapping,
- use a public/private RSA key to unwrap a symmetric key to be used in wrapping and unwrapping the master key,
- wrap and unwrap the master key using a symmetric key,
- generate temporary RSA key pairs in pre-allocated memory,
- extract private RSA keys via a symmetric key,
- manage X.509 certificates,
- store certificates as "opaque data", and
- provide for extraction of certificates by external entity.

In accordance with the foregoing, the HSM chip card 105 is a physically secure device that is programmable and can logically export PKCS#11. The HSM chip card 105 can store keys and certificates. Also, the HSM chip card can serve as a secure transport mechanism for transporting keys between physical locations. For example, the HSM chip card 105 can operate to wrap the master key using a transport key. Then, the transport key can be put on a Java card and transported. A personal identification number (PIN) of the Java card acts as security for the transport key. Once the transport key arrives at its destination, the transport key can be accessed by an authorized entity and used to unwrap the master key on the HSM chip card 105.

Since the Java card is a physically secure device, the Java card provides a physically secure platform on which the HSM functionality of PKCS#11 can be implemented. In an embodiment where the processing and memory capabilities of the Java card are limited, the HSM application 309 implemented on the Java card can be defined to provide a subset of the complete PKCS#11 functionality. Thus, the Java card configured as the HSM chip card 105 can provide a light-weight HSM. Additionally, the Java card configured as the HSM chip card 105 can provide for easy physical removal of the HSM and storage of the HSM in a secure location such as a safe.

Figure 4:
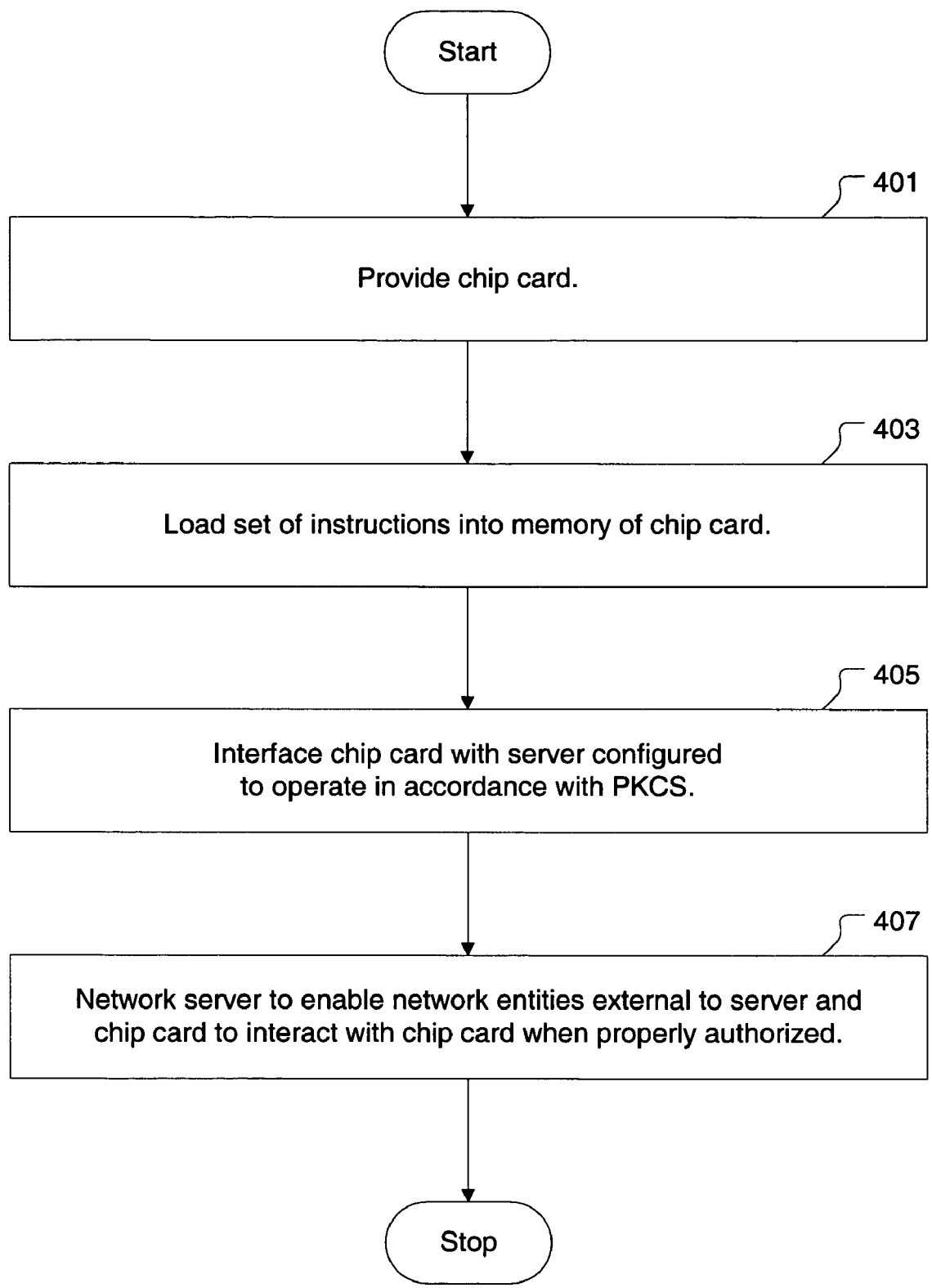
FIG. 4 is an illustration showing a flowchart of a method for providing a HSM, in accordance with one embodiment of the present invention.

FIG. 4 is an illustration showing a flowchart of a method for providing a HSM, in accordance with one embodiment of the present invention. In an operation 401, a chip card is provided. The chip card includes processing circuitry capable of operating in accordance with a set of instructions stored in a memory of the chip card. In an operation 403, a set of instructions are loaded into the memory of the chip card. The set of instructions are defined to implement a public-key cryptography standard (PKCS). In one embodiment, the PKCS is a Cryptographic Token Interface Standard known as PKCS#11. Also, in one embodiment, the chip card is a Java card that is compliant with Java Card Enterprise Software. The Java card includes one or more applets to enable the Java card to operate with a PKCS compliant device. The method further includes an operation 405 for interfacing the chip card with a server configured to operate in accordance with the PKCS. In an operation 407, the server is networked to enable network entities external to the server and the chip card to interact with the chip card when properly authorized. Thus, the method requires an entity to be properly authenticated in order to interact with the chip card via the server. Among many other functions, the chip card can be operated to generate a master key and store the generated master key in the memory of the chip card.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A hardware security module (HSM) chip card, comprising:
   processing circuitry integrated on the HSM chip card, the processing circuitry configured to operate in accordance with a set of program instructions; and
   a memory integrated on the HSM chip card, the memory having the set of program instructions stored therein, wherein the set of program instructions includes program instructions for implementing a public-key cryptography standard (PKCS), the PKCS including processes for generating and storing a master key, wherein the master key is to be stored in the memory on the HSM chip card, the set of program instructions also including processes for enabling the HSM chip card to direct management control of standard chip cards using the master key stored in the memory of the HSM chip card.

2. A HSM chip card as recited in claim 1, wherein the HSM chip card is a Java card compliant with Java Card Enterprise Software.

3. A HSM chip card as recited in claim 1, wherein the set of program instructions for implementing the PKCS includes program instructions for exporting a Cryptographic Token Interface Standard known as PKCS#11.

4. A HSM chip card as recited in claim 1, wherein the set of program instructions for implementing the PKCS includes program instructions for using the master key to perform encryption.

5. A HSM chip card as recited in claim 1, wherein the set of program instructions for implementing the PKCS includes program instructions for extracting Rivest, Shamir, and Adleman (RSA) public key data.

6. A HSM chip card as recited in claim 1, wherein the set of program instructions for implementing the PKCS includes program instructions for generating a unique Rivest, Shamir, and Adleman (RSA) key pair.

7. A HSM chip card as recited in claim 1, wherein the set of program instructions for implementing the PKCS includes program instructions for using a Rivest, Shamir, and Adleman (RSA) key pair to unwrap a symmetric key to be used in wrapping and unwrapping the master key.

8. A HSM chip card as recited in claim 1, wherein the set of program instructions for implementing the PKCS includes program instructions for wrapping and unwrapping the master key using a symmetric key.

9. A hardware security module (HSM) system, comprising:
   a chip card including,
      processing circuitry integrated on the chip card, the processing circuitry being configured to operate in accordance with a set of program instructions for implementing a public-key cryptography standard (PKCS), and
      a memory integrated on the chip card, the memory having the set of program instructions for implementing the PKCS stored therein, wherein the set of program instructions for implementing the PKCS includes program instructions for generating a master key and storing the master key in the memory;
   a chip card reader configured to interface with the chip card, the chip card reader enabling access to data and functionality within the chip card; and
   a server defined to communicate with the chip card via the chip card reader.

10. A HSM system as recited in claim 9, wherein the server includes a PKCS library to enable communication with the chip card.

11. A HSM system as recited in claim 9, wherein the memory includes one or more applets and a virtual machine to execute the one or more applets, wherein the one or more applets are defined to implement the PKCS.

12. A HSM system as recited in claim 9, wherein the chip card is a Java card compliant with Java Card Enterprise Software.

13. A HSM system as recited in claim 9, wherein the set of program instructions for implementing the PKCS includes program instructions for exporting a Cryptographic Token Interface Standard known as PKCS#11.

14. A HSM system as recited in claim 9, wherein the set of program instructions for implementing the PKCS includes program instructions for using a master key to perform encryption.

15. A method for providing a hardware security module (HSM), comprising:
   providing a chip card having processing circuitry capable of operating in accordance with a set of instructions stored in a memory of the chip card;
   loading a set of instructions for implementing a public-key cryptography standard (PKCS) into the memory of the chip card;
   operating the chip card to generate a master key;
   storing the master key in the memory of the chip card;
   interfacing the chip card with a server configured to operate in accordance with the PKCS; and
   networking the server to enable network entities external to the server and the chip card to interact with the chip card when properly authorized.

16. A method for providing a HSM as recited in claim 15, further comprising:
   requiring an entity to be properly authenticated in order to interact with the chip card via the server.

17. A method for providing a HSM as recited in claim 15, wherein the PKCS is a Cryptographic Token Interface Standard known as PKCS#11.

18. A method for providing a HSM as recited in claim 15, wherein the chip card is a Java card compliant with Java Card Enterprise Software, the Java card including an applet to enable the Java card to operate with a PKCS compliant device.

* * * * *